April 26, 1966     J. FAJANS     3,248,660
OPTICAL MASER AMPLIFIER AND OSCILLATOR
Filed Oct. 2, 1963
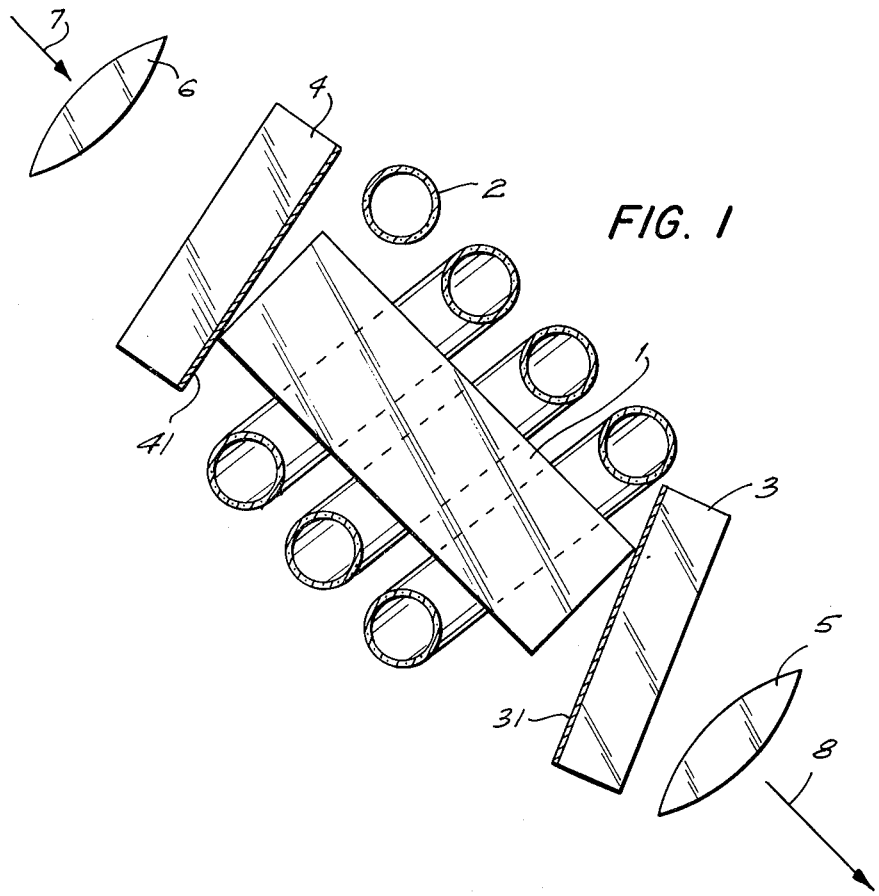
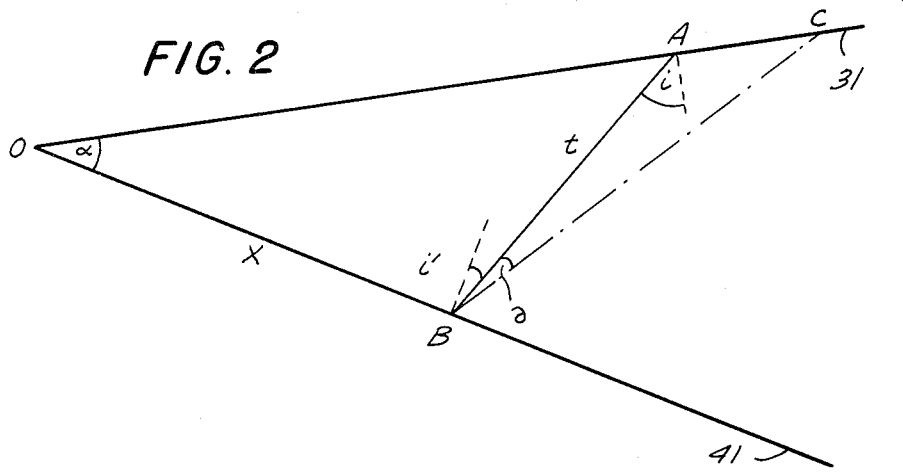
INVENTOR.
JACK FAJANS
BY Hans Berman
AGENT United States Patent Office
3,248,660
Patented Apr. 26, 1966

3,248,660
OPTICAL MASER AMPLIFIER AND OSCILLATOR
Jack Fajans, Douglaston, N.Y., assignor to Electrokinetics Corporation, Florham Park, N.J., a corporation of New York
Filed Oct. 2, 1963, Ser. No. 314,582
12 Claims. (Cl. 330—4.3)

This application is a continuation-in-part of my copending application Serial Number 140,307, filed on September 25, 1961, and now abandoned.

This invention relates to devices for the amplification of light by stimulated emission of radiation, and more particularly to an arrangement for stabilizing the emitted radiation in a single mode.

Known devices for amplification of electromagnetic oscillations by stimulated emission of radiation, hereinafter referred to as "masers" are arranged to maintain a single mode of oscillation by the use of an enclosing cavity the dimensions of which are of the same order of magnitude as the wavelength of the oscillations. Such cavities are commonly employed with masers operating at wavelengths of several centimeters, and at longer wavelengths. With optical masers which emit radiation having a wavelength of the order of $10^{-4}$ and $10^{-5}$ centimeters, it is not practical to build cavities based on the same principle. Masers which operate at such wavelengths which include the infrared, visible, and ultraviolet spectra will hereinafter be referred to as "optical masers."

Although enclosures for optical masers have been proposed which avoid the stringent dimensional limitations outlined above, it is still characteristic of the present state of this art that operation of an optical maser in a single mode cannot be achieved in an enclosure in which the necessary reflecting walls are spaced apart over a distance which is greater than the wavelength of the maser output beam by many orders of magnitude. The space limitations of the enclosures known at this time limit the quantity of material in which stimulated radiation may be excited, and thereby hold the single mode output of existing optical masers to a very low value.

An object of this invention is the provision of a reflecting enclosure for a maser, particularly an optical maser, in which the spacing of the opposite reflecting walls may be substantially increased over that now available, thereby permitting the use of maser material having dimensions of at least several centimeters in the direction of the maser beam.

Another object is the provision of an enclosure which permits simple input and output coupling to the optical maser.

With these and other objects in view, I interpose the maser between two line gratings inclined relative to each other at an acute angle in such a manner that the following relationships hold:

$$m\lambda = 2d \sin i \text{ and } m'\lambda = 2d' \sin i' \qquad (1)$$

wherein $m$ and $m'$ respectively are the orders of interference in which the line gratings operate, and are integers not smaller than 1. High values of $m$, $m'$ have little practical significance. For the purposes of this invention, the upper limit of significance of $m$, $m'$ is 10.

$\lambda$ is the wavelength of the radiation emitted by the masser when stimulated, $d$ and $d'$ respectively are the line spacings of the two gratings, and $i$ and $i'$ are the respective angles of incidence of the maser beam on the two line gratings.

If the conditions of Equations 1 are fulfilled, one of the modes of the maser beam is favored over the others. The predominance of the favored mode reaches practical proportions when the parameters R and R' in Equations 2 have a value not greater than 10:

$$R = \frac{ut \tan i}{L \cos i}$$

$$R' = \frac{ut \tan i'}{L' \cos i'} \qquad (2)$$

In Equations 2, $t$ is the spacing of the two line gratings as measured along the preferred mode of the maser beam, $u$ is the index of refraction of the medium through which the beam passes, and L and L' respectively are the effective widths of the two line gratings.

The exact nature of this invention as well as other objects and advantages thereof will be readily apparent from consideration of the following specification relating to the annexed drawing in which:

FIG. 1 shows a preferred embodiment of the maser arrangement of this invention in a sectional plan view; and FIG. 2 illustrates the operation of the arrangement and shows certain geometrical relationships relative thereto.

Referring initially to FIG. 1, there is shown a known optical maser illustrated only to the extent necessary for an understanding of this invention, and consisting essentially of a single crystal ruby rod 1 and a source of pumping energy represented by a tubular quartz-walled xenon flash lamp 2 of helical shape coaxial with the ruby rod 1.

The ruby rod 1 is cylindrical and has a chromium content of 0.07 percent. When supplied with energy by the xenon lamps, the ruby rod generates a beam of radiation of a wavelength of 6943 angstrom units through its radially extending end faces. The pumping energy of the xenon lamps is supplied from a power pack which is of conventional construction and therefore not illustrated. The power pack includes a capacitor of adequate size, preferably of the order of several hundred microfarads, and a voltage source for charging the capacitor to approximately 3,500 volts. Discharge of the capacitor through the flask lamps excites the pumping radiation.

Two optically flat glass plates 3 and 4 are arranged opposite each other adjacent the respective flat end faces of the ruby rod. The opposite respective major faces of the plates 3, 4 carry line gratings 31, 41. Optical systems of which only the lenses 5 and 6 are shown, are arranged adjacent the other respective major faces of the plates 3, 4. The elements illustrated in FIG. 1 are mounted on a conventional optical bench (not shown). The lenses 5, 6 and the plates 3, 4 are aligned with the axis of the cylindrical ruby rod 1. A source of stimulating radiation, such as a monochromator (not illustrated), provides a beam 7 whose rays have a wavelength of 6943 A. and are trained on the ruby rod 1 by the lens 6. An amplified beam of the same wavelength and oscillating predominantly in a single mode is emitted through the lens 5 in the direction of the arrow 8.

The line gratings 31, 41 are produced by depositing a layer of aluminum on the glass plates 3, 4 by vacuum evaporation to an approximately uniform thickness of one micron. The aluminum layer is ruled on a conventional ruling machine to form the grating. The lines are blazed to favor reflection in the direction desired.

Echelon or echelette gratings may be substituted for the line gratings 31, 41, and the term "line grating" as hereinafter employed will be understood to include such modified line gratings. As applied to echelon and echelette gratings, the term "effective line spacing" designates the spacing of corresponding portions of successive steps of the echelon or echelette grating.

The plates 3, 4 with their line gratings 31, 41 each reflect approximately 90 percent of the incident radiation of 6943 A., and transmit about 8 percent, the remainder being lost by absorption. These figures are merely illustrative of preferred conditions that are readily achieved. Obviously, absorption losses should be kept to a minimum, and the distribution of the remaining radiation between reflected and transmitted portions may be chosen within wide limits to suit particular requirements. The practical lower and upper limits of reflectivity of the line gratings consistent with useful operation of the device are at reflectivities of approximately 60 and 99 percent respectively. The partial transparency of the gratings 31, 41 provides coupling of the maser to external space by the lens 5.

The known equation relating the angles of incidence and reflection of a line grating is $$m\lambda = d(\sin i + \sin \theta) \quad (3)$$

wherein $m$, $\lambda$, and $i$ have the above-described meaning, and $\theta$ is the angle of reflection. For operation in a single mode, at least a major portion of the beam of stimulated radiation must be reflected on itself so that $$i = \theta \quad (4)$$

and Equation 3 assumes the form $$m\lambda = 2d \sin i \text{ and } m'\lambda = 2d' \sin i' \quad (1)$$

wherein primed values relate to the line grating 41, and those without prime to the grating 31. If the line spacing of the two gratings is related to the wavelength of the stimulated radiation of the maser crystal 1 and to the angles of incidence (which also are the angles of reflection) in the manner indicated in Equation 1, emission of a single mode of radiation by the ruby 1 is favored.

The extent to which other modes of radiation are excluded by interference damping during multiple passage through the ruby 1 between the line gratings 31, 41 depends on the angular width of the beam reflected from the grating. This angular width is conventionally defined by the angle $\Delta$ which is related to the wavelength $\lambda$ of the reflected light, the ruled width $L$ of the grating, the spacing $t$ of the line gratings 31, 41 along the central ray of the beam, and the index of refraction of the medium separating the gratings by the known equation $$\Delta = \frac{\lambda}{2L \cos i} \quad (5)$$

The angular width $\Delta$ gives the angle with respect to a central ray at which the intensity of a beam is one half of the intensity in the direction of the central ray. The portion of the beam defined within the angular width $\Delta$ carries approximately 70 percent of the beam energy, and the minor portion of the beam outside of the width $\Delta$ may be neglected for the purposes of the present discussion.

Reflection substantially in a single mode is thus achieved by the apparatus shown in FIG. 1 when the separation angle $\delta$ of the preferred mode of reflection from the adjacent modes of the line grating is greater, and preferably substantially greater than the angular width $\Delta$ of the reflected beam. Radiation predominantly in one mode is still obtained when the values of $\Delta$ and $\delta$ are about equal. The intensity of the preferred mode becomes almost indistinguishable from that of other modes when the angular width $\Delta$ is about ten times the value of the mode separation angle $\delta$.

FIG. 2 illustrates the geometrical relationships between the elements of the maser arrangement of the invention which result from the above-described facts.

The lines (31) and (41) are section lines drawn through the line gratings 31 and 41 respectively in the plane of reflection of a preferred mode of a maser beam which extends in the direction of the axis of the ruby 1. The central ray of this beam intersects the lines (31) and (41) respectively at the points A and B. The lines (31) and (41) intersect each other at the point O where they define an angle $\alpha$ which is identical with the angle of inclination defined by the two line gratings 31, 41. The angles of incidence defined by the central ray with respective lines perpendicular to the lines (31) and (41) at points A and B are $i$ and $i'$.

If the length of the central ray between the points A and B is $t$, and the distance between the points B and O is $x$, the following equation holds:

$$\frac{\sin \alpha}{t} = \frac{\sin(90-i)}{x} = \frac{\cos i}{x} \quad (6)$$

The central ray of an adjacent mode reflected from the point B extends along the line BC which defines the angle $\delta$ with the line BA and is longer than $t$ by a factor $\lambda/2u$ wherein $\lambda$ and $u$ have the meaning indicated above. In analogy with Equation 6, it follows that $$\frac{\sin \alpha}{t + \lambda/2u} = \frac{\cos(i+\delta)}{x} \quad (7)$$

$$\frac{t}{t+\lambda/2u} = \frac{\cos i \cos \delta - \sin i \sin \delta}{\cos i} \quad (8)$$

$$\frac{1-\lambda/2ut}{1-(\lambda/2ut^2)} = \cos \delta - \tan i \sin \delta \quad (9)$$

For values of $\lambda$ which are very much smaller than $t$, and for values of $\delta$ that are very much smaller than one radian, Equation 9 may be written as $$1 - \lambda/2ut = 1 - \delta \tan i \quad (10)$$

$$\delta = \frac{\lambda}{2ut \tan i} \quad (11)$$

The ratio $R = \Delta/\delta$ is a measure of the predominance of the preferred single mode of operation of the maser. For operation in a single mode, $R$ should be as small as possible, and preferably not greater than 1. When $R$ exceeds a value of 10, the difference in amplitude between the preferred mode and the adjacent modes is practically insignificant.

The ratio $R$ is arrived at from the dimensional properties of the maser arrangement as they apply to the grating 31 from the equation $$R = \frac{\Delta}{\delta} = \frac{ut \sin i}{L(1-\sin^2 i)} \quad (12)$$

$R'$ is the corresponding parameter relating to the grating 41 and its magnitude is $$R' = \frac{\Delta'}{\delta'} = \frac{ut \sin i'}{L(1-\sin^2 i')} \quad (13)$$

It is evident that the angles of incidence $i$ and $i'$ should preferably be small. When the angle of inclination $\alpha$ is small, and the line gratings are placed as closely as possible to the ruby rod 1, the intervening air space may be neglected, the length of the central ray of the preferred mode is practically identical with the length of the ruby 1, and the effective lined width $L$ of the gratings becomes practically identical with the diameter of the cylindrical rod 1 or with the largest transverse dimension of an elongated rod if the rod were shaped differently from a cylinder.

For a predetermined predominance of the preferred single mode of oscillation of the output beam of the optical maser of FIG. 1, the angles of incidence $i$ and $i'$ should be decreased with increasing length of the ruby rod between the reflecting gratings.

The following table lists values for the several parameters of two maser arrangements according to FIG. 1 which perform satisfactorily and the output of which consists substantially of a single mode of coherent light of 6943 A. wavelength. The meaning of the symbols listed is the same as in the preceding discussion.

| Parameter | Example I | Example II |
|---|---|---|
| $d$, cm | $5 \times 10^{-4}$ | $10^{-3}$ |
| $d'$, cm | $5.705 \times 10^{-4}$ | $5.705 \times 10^{-4}$ |
| $i$ | 3°59′ | 3°59′ |
| $i'$ | 3°29′ | 3°29′ |
| $\alpha$ | 30′ | 30′ |
| $\Delta$, radians | $3 \times 10^{-5}$ | $3 \times 10^{-5}$ |
| $\delta$, radians | $6 \times 10^{-5}$ | $6 \times 10^{-5}$ |
| $m$ | 1 | 2 |
| $m'$ | 1 | 1 |

When the $i$ and $i'$ become small, $\alpha$ also becomes small since $$\alpha = i + i' \quad (14)$$

as is evident from inspection of FIG. 2. It is essential though that $\alpha$ be different from zero. In other words, selective amplification of a single mode is impossible when the two line gratings 31, 41 are parallel. $\alpha$ should preferably not be greater than 10°.

Operation in the principal mode of each line grating ($m=1$) is preferred, but not essential to successful operation. Values of $m$ that exceed 10 will not usually result in desirable operating characteristics.

The apparatus illustrated in FIG. 1 has a very useful field of application in the amplification of an optical input signal 7. Particularly advantageous results are obtained in the infrared spectrum and in the low frequency range of the visible spectrum, but the maser arrangement of the invention when equipped with a maser operative at a wavelength different from that of the ruby shown in FIG. 1 will be equally effective at that different wavelength when the precautions obvious to those skilled in the art are observed, such as the avoidance of materials of construction for the optical elements of the system which absorb radiation of the operating wavelength.

When supplied with sufficient pumping energy, the apparatus illustrated in FIG. 1 operates as an oscillator and a source of a beam of coherent light oscillating in a single mode in a manner well understood by those skilled in this art. It will be appreciated that the device of FIG. 1 when operating as an oscillator will not require the optical system represented by the lens 6 nor a source of stimulating radiation, and the line grating 41 may be fully opaque.

Other modifications of the optical maser arrangement of the invention are contemplated and may be obviously resorted to by those skilled in the art without departing from the spirit and scope of the invention as hereinafter defined by the appended claims, as only a preferred embodiment thereof has been disclosed.

What I claim is:

1. In a maser arrangement, in combination, two line grating means having respective opposite reflecting faces spaced from each other and defining an acute angle of inclination therebetween; generating means for generating a beam of substantially coherent electromagnetic oscillations of substantially uniform wavelength incident on said faces, said beam defining with respective directions normal to said faces respective angles of incidence, said angles of incidence and the effective line spacings of said line grating means being related by the equations $$m\lambda = 2d \sin i \text{ and } m'\lambda = 2d' \sin i'$$

wherein $d$ and $d'$ are said line spacings respectively, $m$ and $m'$ are integers between 1 and 10, $\lambda$ is said wavelength, and $i$ and $i'$ respectively are said angles of incidence.

2. In an arrangement as set forth in claim 1, said line grating means each having a reflectivity of at least sixty percent for said beam, the reflectivity of one of said line grating means being not substantially greater than 99 percent, and said one line grating means being at least partly permeable to the unreflected portion of said beam.

3. In an arrangement as set forth in claim 2, said generating means including a maser member and means for supplying pumping energy to said maser member, said maser member being interposed between said faces and adapted to emit said beam when stimulated by rays of said wavelength and supplied with said energy.

4. In an arrangement as set forth in claim 3, said generating means including a source of said rays, said rays being trained on said maser member.

5. In an arrangement as set forth in claim 4, the source of said rays being spaced from one of said line grating means substantially in the direction of said beam and away from the other line grating means.

6. In an arrangement as set forth in claim 1, the spacing of said line grating means as measured along said beam being $t$, the refractive index of the medium intermediate said line grating means and passed by said beam being $u$, the effective lined width of said line grating means being L and L′, respectively, and $t$, $u$, L, L′, $i$, and $i'$ being related by the equations $$R = \frac{ut . \tan i}{L \cos i}$$

and $$R' = \frac{ut . \tan i'}{L' \cos i'}$$

R and R′ being smaller than ten.

7. In an arrangement as set forth in claim 6, R and R′ being not greater than 1.

8. In an arrangement as set forth in claim 1, said line grating means constituting the reflecting walls of an enclosure, said generating means including a maser member in said enclosure and means for supplying pumping energy to said maser member; and coupling means for coupling said maser member to the external space outside said enclosure.

9. In a maser arrangement, in combination, two line grating means having respective opposite reflecting faces spaced from each other; and defining an acute angle of inclination therebetween; maser means interposed between said faces; means for supplying pumping energy to said maser means, said maser means being adapted to emit a beam of substantially coherent electromagnetic oscillations of substantially uniform wavelength when supplied with said pumping energy, said beam defining with respective directions normal to said faces respective angles of incidence of said beam on said faces, said angles and the effective line spacings of said line grating means being related by the equations $$m\lambda = 2d \sin i \text{ and } m'\lambda = sd' \sin i'$$

wherein $m$ and $m'$ are integers between 1 and 10, $\lambda$ is said wavelength, $i$ and $i'$ respectively are said angles of incidence, and $d$ and $d'$ are said respective line spacings.

10. In a maser arrangement as set forth in claim 9, said wavelength being of the order of magnitude of $10^{-4}$ to $10^{-5}$ centimeters.

11. In a maser arrangement as set forth in claim 9, at least one of said integers being 1.

12. In a maser arrangement as set forth in claim 9, said acute angle being not greater than ten degrees.

No references cited.

ROY LAKE, *Primary Examiner.*